US012569805B2

(12) United States Patent
Song et al.

(10) Patent No.: US 12,569,805 B2
(45) Date of Patent: Mar. 10, 2026

(54) CO2 CAPTURE APPARATUS BY HYDRATE METHOD BASED ON ELECTRIC FIELD AND METHOD THEREFOR

(71) Applicant: DALIAN UNIVERSITY OF TECHNOLOGY, Dalian (CN)

(72) Inventors: Yongchen Song, Dalian (CN); Mingjun Yang, Dalian (CN); Mingyu Wu, Dalian (CN); Bingbing Chen, Dalian (CN); Lanlan Jiang, Dalian (CN); Yu Liu, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 519 days.

(21) Appl. No.: 18/030,218

(22) PCT Filed: Jun. 22, 2022

(86) PCT No.: PCT/CN2022/100268
§ 371 (c)(1),
(2) Date: Apr. 4, 2023

(87) PCT Pub. No.: WO2023/240663
PCT Pub. Date: Dec. 21, 2023

(65) Prior Publication Data
US 2024/0252982 A1 Aug. 1, 2024

(30) Foreign Application Priority Data
Jun. 15, 2022 (CN) ........................ 202210685426.X

(51) Int. Cl.
*B01D 53/78* (2006.01)
*B01D 53/62* (2006.01)
(52) U.S. Cl.
CPC ............. *B01D 53/78* (2013.01); *B01D 53/62* (2013.01); *B01D 2252/1035* (2013.01); *B01D 2257/504* (2013.01); *B01D 2258/0283* (2013.01); *B01D 2259/80* (2013.01)

(58) Field of Classification Search
CPC ................... B01D 53/78; B01D 53/62; B01D 2252/1035; B01D 2257/504;
(Continued)

(56) References Cited

FOREIGN PATENT DOCUMENTS

CN 101513600 A 8/2009
CN 104495964 A 4/2015
(Continued)

OTHER PUBLICATIONS

Chen ("Effect of a weak electric field on THF hydrate formation: Induction time and morphology") Journal of Petroleum Science and Engineering, Elsevier (Year: 2020).*
(Continued)

*Primary Examiner* — Anthony J Zimmer
*Assistant Examiner* — Starfari Teshawn McClain
(74) *Attorney, Agent, or Firm* — MUNCY, GEISSLER, OLDS & LOWE, P.C.

(57) ABSTRACT

The present invention belongs to the technical field of hydrate application, and proposes an electric field-based $CO_2$ capture apparatus by a hydrate method and a method therefor. Small particles of hydrate are generated by incoming seawater and incoming hydrate former at low temperature and high pressure. After flowing through the electric field, the particles are quickly formed, and then separated, dried and compressed efficiently by a solid-liquid separation chamber. Finally, hydrate blocks are produced. The combination of a stirring method, a spraying method and an external electric field can effectively solve the characteristics of slow hydrate formation and long cycle. The solid-liquid separation chamber can be designed to efficiently filter out the hydrate particles and prevent a filter plate from blocking. The use of heat exchange chambers in many places make the
(Continued)

cooling amount in the discharged waste recycled, greatly thereby improving the utilization efficiency of energy and economic benefits.

9 Claims, 4 Drawing Sheets

(58) Field of Classification Search
CPC ........ B01D 2258/0283; B01D 2259/80; Y02C 20/40; Y02P 20/151
See application file for complete search history.

(56) References Cited

FOREIGN PATENT DOCUMENTS

| | | | |
|---|---|---|---|
| CN | 106587188 | A | 4/2017 |
| CN | 106955569 | A | 7/2017 |
| CN | 107055706 | A | 8/2017 |
| CN | 109468150 | A | 3/2019 |
| CN | 109731530 | A | 5/2019 |
| JP | 2006089419 | A | 4/2006 |

OTHER PUBLICATIONS

Lee ("CO2 Hydrate Composite for Ocean Carbon Sequestration"), Environ. Sci. Technol. 2003, 37, 3701-3708 (Year: 2003).*
Wang et al., "Advances on Methods Promoting the Rapid Formation of Carbon Dioxide Hydrate and Mechanisms," China Biogas 2012, 30(3), 6 pages.

* cited by examiner

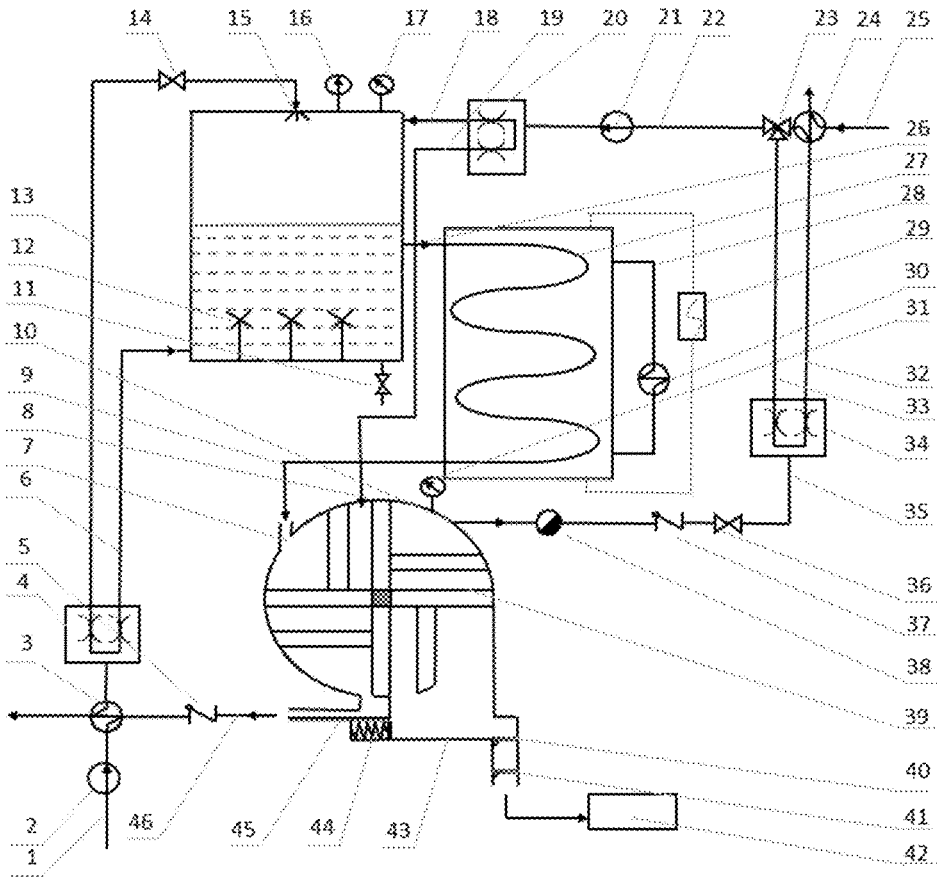
Fig. 2
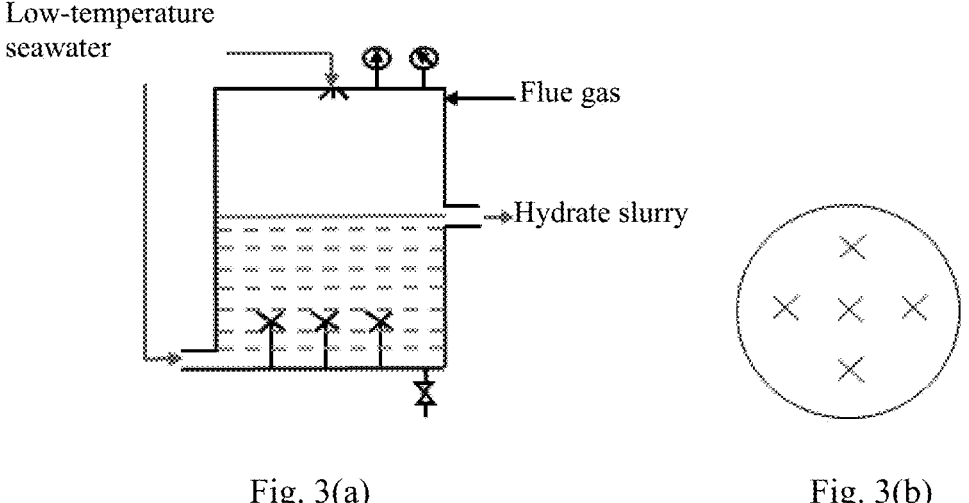
Fig. 3(a)                                    Fig. 3(b)

(a)                          (b)

(a)                                    (b)

CO2 CAPTURE APPARATUS BY HYDRATE METHOD BASED ON ELECTRIC FIELD AND METHOD THEREFOR

TECHNICAL FIELD

The present invention belongs to the technical field of hydrate application, and specifically relates to an electric field-based $CO_2$ capture apparatus by a hydrate method and a method therefor.

BACKGROUND

In all the gases that contribute to the greenhouse effect, $CO_2$ is considered to be a main greenhouse effect producer. In recent years, the increasingly serious greenhouse effect has forced more and more countries and international organizations to express great concern about $CO_2$ emission, capture and storage. In 2020, China's carbon dioxide emissions reached 102.4 tons, accounting for 31.7% of the global $CO_2$ emissions, among which the extensive use of coal is a main factor causing China's huge carbon emissions (see "Analysis of Carbon Emission in China's Manufacturing Industry and Countermeasures for Emission Reduction" published by Fan Zhang et al). The separation and capture of $CO_2$ from coal-fired power plants is critical to achieving $CO_2$ reduction targets under the condition of full use of coal and other fossil fuels.

The separation of $CO_2$ by a hydrate method is an efficient, economical and practical separation technology different from traditional methods (see the research status of $CO_2$ separation by a hydrate method published by Chungang Xu et al). The technology of the $CO_2$ capture by a hydrate method is suitable for the capture of $CO_2$ in the flue gases from the coal-fired power plants, which is considered by the US Department of Energy (DOE) as the most promising long-term $CO_2$ capture technology.

At present, researchers have made some achievements in the field of a technology of $CO_2$ capture based on a hydrate method, but the existing $CO_2$ capture apparatuses based on the hydrate method have the following problems: hydrate nucleation is slow and growth cycle is long; the hydrate block is difficult to separate from the slurry; and an integrated apparatus has high energy consumption and is difficult to be industrialized. Several interrelated functional areas in the present invention can well solve the above problems.

SUMMARY

Based on an existing problem of a $CO_2$ capture apparatus by a hydrate method, the present invention provides an electric field-based $CO_2$ capture apparatus by a hydrate method and a method therefor, providing an industrialization device for the technology of $CO_2$ capture by hydrate method, and the products obtained can be stored directly.

The technical solution of the present invention is as follows: an electric field-based $CO_2$ capture apparatus by a hydrate method comprises a seawater input module, a hydrate former supply module, a hydrate nucleation module, a hydrate enhanced growth module, an external electric field module, a hydrate slurry filtration module and a hydrate block collection module;

the seawater input module comprises a seawater supply pipeline 1, a heat exchanger a3 and a diverter valve a4; incoming seawater is pre-cooled in the heat exchanger a3 through the seawater supply pipeline 1 and a centrifugal pump a2, and then flows through the diverter valve a4 into two ways according to the set ratio, i.e., a first seawater supply pipeline 13 and a second seawater supply pipeline 6 respectively; the first seawater supply pipeline 13 is connected to a spray head 15 at the top of a hydrate nucleation chamber through the valve 14, and the second seawater supply pipeline 6 is connected to the bottom of the hydrate nucleation chamber;

the hydrate former supply module comprises an incoming hydrate former pipeline 25, a hydrate former recovery pipeline 35, a hydrate former supply main pipeline 22, a first hydrate former supply pipeline 18 and a second hydrate former supply pipeline 19; after the incoming hydrate former enters an heat exchanger b24 through the incoming hydrate former pipeline 25 for heat transfer, the hydrate former enters the hydrate former supply main pipeline 22 through a mixing valve 23; and a centrifugal pump b21 and a diverter valve b20 are arranged on the hydrate former supply main pipeline 22; the hydrate former is divided into two ways through the diverter valve b20, i.e., the first hydrate former supply pipeline 18 and the second hydrate former supply pipeline 19 respectively; the first hydrate former supply pipeline 18 is connected to the top of the hydrate nucleation chamber and is used for replenishing the hydrate former so that the pressure reaches the designed pressure; the second water hydrate former pipeline 19 is connected to a hydrate solid-liquid separation chamber 39; the hydrate solid-liquid separation chamber 39 is connected with the hydrate former recovery pipeline 35; and the hydrate former flows out of the hydrate solid-liquid separation chamber 39, passes through a drain valve 38, a check valve b37, a back pressure valve 36 and a diverter valve c34 in turn, and then flows to the hydrate former recovery pipeline 35; the recovered hydrate former flows into two ways through the diverter valve c34, i.e., a hydrate former recapture pipeline 33 and an exhaust gas discharge pipeline 32 respectively; the exhaust gas discharged from the exhaust gas discharge pipeline 32 firstly flows through the heat exchanger b24 for heat transfer, to precool the incoming hydrate and then discharge; and the hydrate former in the hydrate former recapture pipeline 33 is mixed with the precooled hydrate former into the hydrate former supply main pipeline 22.

The hydrate nucleation module comprises a hydrate nucleation chamber; a spray head 15, a hydrate former inlet, a first pressure sensor 17 and a thermometer 16 are arranged above the hydrate nucleation chamber; a hydrate slurry overflow outlet connected to a first hydrate slurry conveying pipeline 26 is arranged on a side wall of the hydrate nucleation chamber, and hydrate slurry binding agent flows into a variable diameter spiral pipeline 27 in the hydrate rapid growth chamber through the first hydrate slurry conveying pipeline 26; a seawater inlet is arranged at the bottom of the hydrate nucleation chamber to receive seawater from the second seawater supply pipeline 6; a plurality of stirrers 12 are arranged at the bottom of the hydrate nucleation chamber, to make the liquid form uniform hydrate slurry and prevent the hydrate from growing at the bottom; and a discharge valve 11 is arranged at the bottom of the hydrate nucleation chamber.

The hydrate enhanced growth module comprises a variable diameter spiral pipeline 27, a circulating refrigeration pipeline 28 and a heat exchanger c30; the hydrate rapid growth chamber is filled with refrigerant and the variable diameter spiral pipeline 27 is placed therein; the circulating refrigeration pipeline 28 is connected with the hydrate rapid growth chamber, and the heat exchanger c30 is installed on the pipeline; and cycle refrigeration of the refrigerant is achieved by the circulating refrigeration pipeline 28 and the heat exchanger c30.

The external electric field module comprises an electrode plate and a DC power supply; and two electrode plates are located at both ends of the hydrate rapid growth chamber respectively, and are used for providing a DC electric field 29 for an environment in which the hydrate enhanced growth module is located;

the hydrate slurry filtration module comprises a hydrate solid-liquid separation chamber 39, and a cross-section thereof is circular; the hydrate solid-liquid separation chamber 39 has a built-in rotating sieve plate frame, comprising a rotating shaft and a multilayer sieve plate; the rotating shaft is arranged in a cross shape in the hydrate solid-liquid separation chamber 39 which is divided into four partitions; the sieve plate is divided into large aperture and small aperture, the sieve plates of each partition are arranged up and down, and the sieve plate with large aperture is located above the partition; two ends of the sieve plate are respectively connected to the rotating shaft and the hydrate solid-liquid separation chamber 39; a pressure gauge 31, a hydrate slurry inlet 7, a hydrate former nozzle 8 and a hydrate former outlet 10 are respectively arranged above the hydrate separation chamber; the hydrate slurry inlet 7 is connected to the hydrate rapid growth chamber through the second hydrate slurry conveying pipeline 9, the hydrate former nozzle 8 is connected to the second hydrate former supply pipeline 19, and the hydrate former outlet 10 is connected to the hydrate former recovery pipeline 35, to realize the reuse of the hydrate former; the concentrated seawater separated from the hydrate solid-liquid separation chamber 39 passes through a check valve a5 and flows into the heat exchanger a3 through a concentrated seawater discharge pipeline 46 for heat transfer, and then is discharged;

the hydrate block collection module comprises a barrier plate 45, a telescopic plate 44, a collection plate 43, a linkage door 40, a hydrate block removal door 41 and a hydrate block collection box 42; the hydrate block collection module is connected with a partition of the hydrate solid-liquid separation chamber 39, the collection plate 43 bears the hydrate blocks in the partition, and the pressure sensor is embedded in the collection plate 43; the telescopic plate 44 is located on one side of the collection plate 43, and the barrier plate 45 is located above the telescopic plate 44, which are linked; the linkage door 40 is located on the other side of the collection plate 43, and a lower end thereof is connected to the hydrate block collection box 42 through the hydrate block removal door 41; and when the telescopic plate 44 moves to the other side of the collection plate 43, the linkage door 40 opens.

The sieve plates have 16 layers, respectively 8 sieve plates with large aperture and 8 sieve plates with small aperture; and two layers of sieve plates are arranged in each partition; and the aperture of the upper sieve plate is larger than that of the lower sieve plate.

The variable diameter spiral pipeline 27 has multiple pipes, and the pipe diameter gradually increases from top to bottom.

The variable diameter spiral pipeline 27 has two different combinations; in the first combination, each variable diameter spiral pipeline 27 has the same pipe diameter; and in the second combination, each variable diameter spiral pipeline 27 has different pipe diameter.

When the hydrate blocks in the hydrate solid-liquid separation chamber 39 are cleaned instead of drying, the hydrate former diverter valve b20 and the second hydrate former supply pipeline 18 in the $CO_2$ capture apparatus by the hydrate method are canceled; and the incoming seawater diverter valve a4 is added into a three-way diverter valve, and the seawater in the third way is sprayed from the hydrate former nozzle 8 into the hydrate solid-liquid separation chamber 39 for rinsing the filtered solid hydrate.

Before the apparatus is customized, parameters such as slurry flow rate, aperture of sieve plate and spacing of sieve plate are determined by reference to the experimental results. A design principle is that the work flow of each partition is equal. When the rotational frequency is certain, each rotation angle can be determined according to the number of partitions and the volume of each partition. The vibration at the end of each rotation is intended to enhance the separation of the hydrate slurry in a left partition, facilitate the natural drop of the hydrate in a right partition and avoid blocking of a sieve hole. The sieve plates are divided into long and short sieve plates according to length thereof. When the long sieve plate is vertical, $$\gamma 1 \left( \tan \gamma_1 = \frac{l_2 + d/2}{d + e} \right)$$

is a corresponding angle of the sieve plate with small aperture, $$\gamma 2 \left( \tan \gamma_2 = \frac{l_2 + d/2}{d + e} \right)$$

is a corresponding angle of the sieve plate with large aperture; $l_2$ is the length of the sieve plate with small aperture; d is spacing of the sieve plate; and e is the distance from the sieve plate with large aperture in short sieve plates to the center of the rotating shaft; and when the long sieve plate tilts, $\beta_2$ is a corresponding angle of the sieve plate with small aperture, and $\beta_1$ is a corresponding angle of the sieve plate with large aperture below the short sieve plate.

Hydrate slurry inlet 7 corresponds to one partition every time; and the hydrate former nozzle 8 corresponds to one partition every time; and the following requirements are satisfied;

$$\theta_2 < \gamma_1; \theta_2 < \beta_2; \theta_1 > \beta_1 \qquad 1)$$

$$\gamma_2 < \theta_3 \qquad 2)$$

where $\theta_2$ is an upper angle of the hydrate slurry inlet 7; $\gamma_1$ is a corresponding angle of the sieve plate with small aperture when the sieve plate is vertical; $\beta_2$ is the corresponding angle of the sieve plate with small aperture when the sieve plate tilts; $\theta_1$ is a lower angle of the hydrate slurry inlet 7; $\gamma_2$ is the corresponding angle of the sieve plate with large aperture when the sieve plate is vertical; and $\theta_3$ is an angle of a center line of the hydrate former nozzle 8.

An electric field-based $CO_2$ capture apparatus by a hydrate method comprises the following steps of:

step 1: the filtered incoming seawater is conveyed to the heat exchanger a3 through the centrifugal pump a2, and heat exchange for the low-temperature concentrated seawater separated and discharged from the hydrate solid-liquid separation chamber 39 is conducted, to achieve pre-cooling; the precooled seawater is divided into two ways through the diverter valve a4; the first way is sprayed from the top of the hydrate nucleation chamber into the inside, and this part of seawater reacts with the incoming hydrate former to nucleate during the spray process; and the second way enters from the bottom of the hydrate nucleation chamber, providing seawater for the subsequent growth of the hydrate and serving as a flowing medium;

step 2: hydrate particles formed above the hydrate nucleation chamber fall to a level and overflow with the slurry from the outlet thereof under the pressure difference and gravity; and the overflowed small particle hydrate slurries flow into the hydrate rapid growth chamber in which the hydrate slurries continue to grow in a spiral pipeline; stirring apparatuses are arranged at the bottom of the hydrate nucleation chamber, and it is difficult for the hydrate to grow on the bottom under the washing of part of the seawater at the bottom inlet and the action of the stirring apparatuses; and at the same time, the stirring apparatuses accelerate the nucleation and growth of the hydrate, ensuring a large and stable supply of small particle hydrate slurries downstream;

step 3: the hydrate growth chamber mainly has variable diameter spiral pipeline groups, and the diameter of each pipeline gradually increases from top to bottom; the outside of the pipeline is filled with circulating refrigerant, and an external electric field is also arranged in the hydrate growth chamber; the hydrate former gas is above an inlet section of the spiral pipeline, and small particle hydrate slurries are below; and in the spiral flow process, the small particle hydrate slurries are fully mixed with the gas, and the reinforcement of the external electric field is conducted, so that the hydrate rapidly grows into large particle hydrate slurry; the increasing pipe diameter and uniform curvature of the pipeline can prevent hydrate from blocking;

step four: the large particle hydrate slurries flow into the hydrate solid-liquid separation chamber 39, and the hydrate slurries only flow into one partition of the hydrate solid-liquid separation chamber 39 at a time and fall to the sieve plate under the action of gravity; the large particles remain on an upper sieve plate, and the small particles remain on a lower sieve plate; and the concentrated seawater continues to fall on a side of the hydrate solid-liquid separation chamber 39 and flows out to the heat exchanger a3, releasing the cold amount and then discharging; after sieving, the loose hydrate blocks are rotated to an upper partition position along with the sieve plate and washed by the high-pressure hydrate former above; at this time, the next partition begins to receive the hydrate slurry, realizing continuous sieving of the hydrate slurries; and the loose hydrate particles washed and dried by the hydrate former continue to rotate with a filter plate until the hydrate particles reach a lower right partition and all fall to a lower hydrate collection plate 43 under the action of gravity; and step five: a pressure sensor is laid in the hydrate collection plate 43; when the weight of the hydrate reaches the required level, a telescopic plate 44 extends to push the hydrate to a compression area and make the hydrate compacted; the barrier plate 45 above the telescopic plate 44 is linked with the telescopic plate 44, getting in and out at the same time, and is used for blocking the hydrate falling from the top when the telescopic plate 44 is working; when the barrier plate 45 is recovered, the upper hydrate is scraped off to a collection area by a wet and dry partition plate; and the linkage door 40 at the bottom of the compression area will automatically open when the telescopic plate 44 is pressed to the end, so that the compressed hydrate block falls to a lower temporary storage area, and the linkage door 40 will be closed when the telescopic plate is recovered.

The hydrate former in step 1 and the high-pressure hydrate former in step 3 are flue gases containing $CO_2$.

The external electric field is the electric field of DC power supply, and the voltage of the DC power supply is 0-12V.

The present invention has the following beneficial effects: $CO_2$ capture in the flue gas is realized using seawater as a raw material, which can industrialize the technology based on a hydrate method. The combination of a stirring method, a spraying method and the external electric field can effectively solve the characteristics of slow hydrate formation speed and long cycle. The solid-liquid separation chamber can be designed to efficiently filter out the hydrate particles and prevent a filter plate from blocking. The use of heat exchange chambers in many places can make the cooling amount in the discharged waste recycled, greatly thereby improving the utilization efficiency of energy and economic benefits.

DESCRIPTION OF DRAWINGS

FIG. 2 is a flow schematic diagram of an electric field-based $CO_2$ capture apparatus by a hydrate method;

FIG. 3 (*a*) is a schematic diagram of the arrangement for stirrers at the bottom of a hydrate nucleation chamber;

FIG. 3 (*b*) is a top view of stirrers at the bottom of a hydrate nucleation chamber;

FIG. 3 (*c*) is a schematic diagram of a side exit of a nucleation chamber in a first combination mode;

FIG. 3 (*d*) is a schematic diagram of an arrangement scheme for a connected spiral pipe in a first combination mode;

FIG. 3 (*e*) is a schematic diagram of a side exit of a nucleation chamber in a second combination mode;

FIG. 3 (*f*) is a schematic diagram of an arrangement scheme for a connected spiral pipe in a first combination mode;

In the figures: 1 seawater supply pipeline; 2 centrifugal pump a; 3 heat exchanger a; 4 flow divider a; 5 check valve a; 6 second sea water supply pipeline; 7 hydrate slurry inlet;

8 hydrate former nozzle; 9 second hydrate slurry conveying pipeline; 10 hydrate former outlet; 11 discharge valve; 12 stirrer; 13 first seawater supply pipeline; 14 valve; 15 spray head; 16 thermometer; 17 first pressure sensor; 18 first hydrate former supply pipeline; 19 second hydrate former supply pipeline; 20 flow divider b; 21 centrifugal pump b; 22 hydrate supply main pipe; 23 mixing valve; 24 heat exchanger b; 25 incoming hydrate former pipeline; 26 first hydrate slurry conveying pipeline; 27 variable diameter spiral pipeline; 28 recirculating refrigeration pipeline; 29 DC electric field; 30 heat exchanger c; 31 pressure gauge; 32 exhaust gas discharge pipeline; 33 hydrate former recapture pipeline; 34 flow divider c; 35 hydrate former recovery pipeline; 36 back pressure valve; 37 check valve b; 38 drain valve; 39 hydrate solid-liquid separation chamber; 40 linkage door; 41 hydrate block removal door; 42 hydrate block collection box; 43 collection plate; 44 telescopic plate; 45 barrier plate; and 46 concentrated seawater discharge pipeline.

<div align="center">DETAILED DESCRIPTION</div>

Specific embodiments of the present invention are described below in detail in combination with the technical solution and accompanying drawings.

Figure 1:
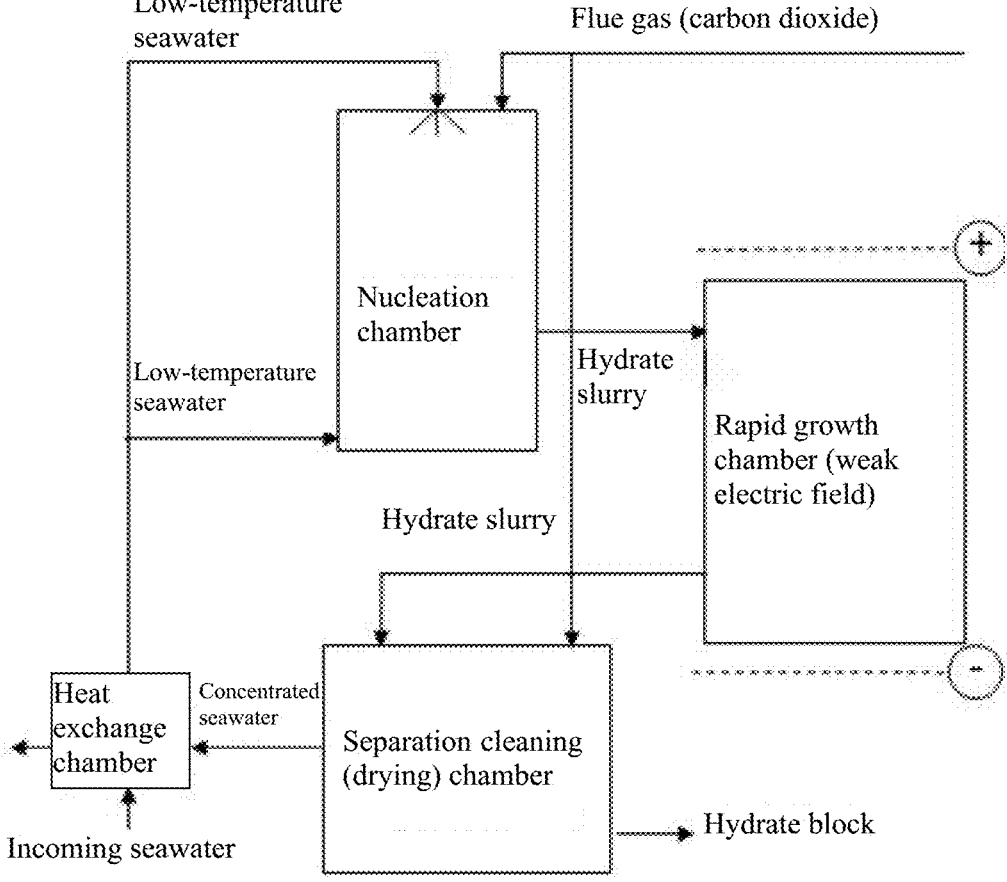
FIG. 1 is a working principal diagram of an electric field-based $CO_2$ capture apparatus by a hydrate method.
Figures 3C, 3D, 3E, 3F, 4:
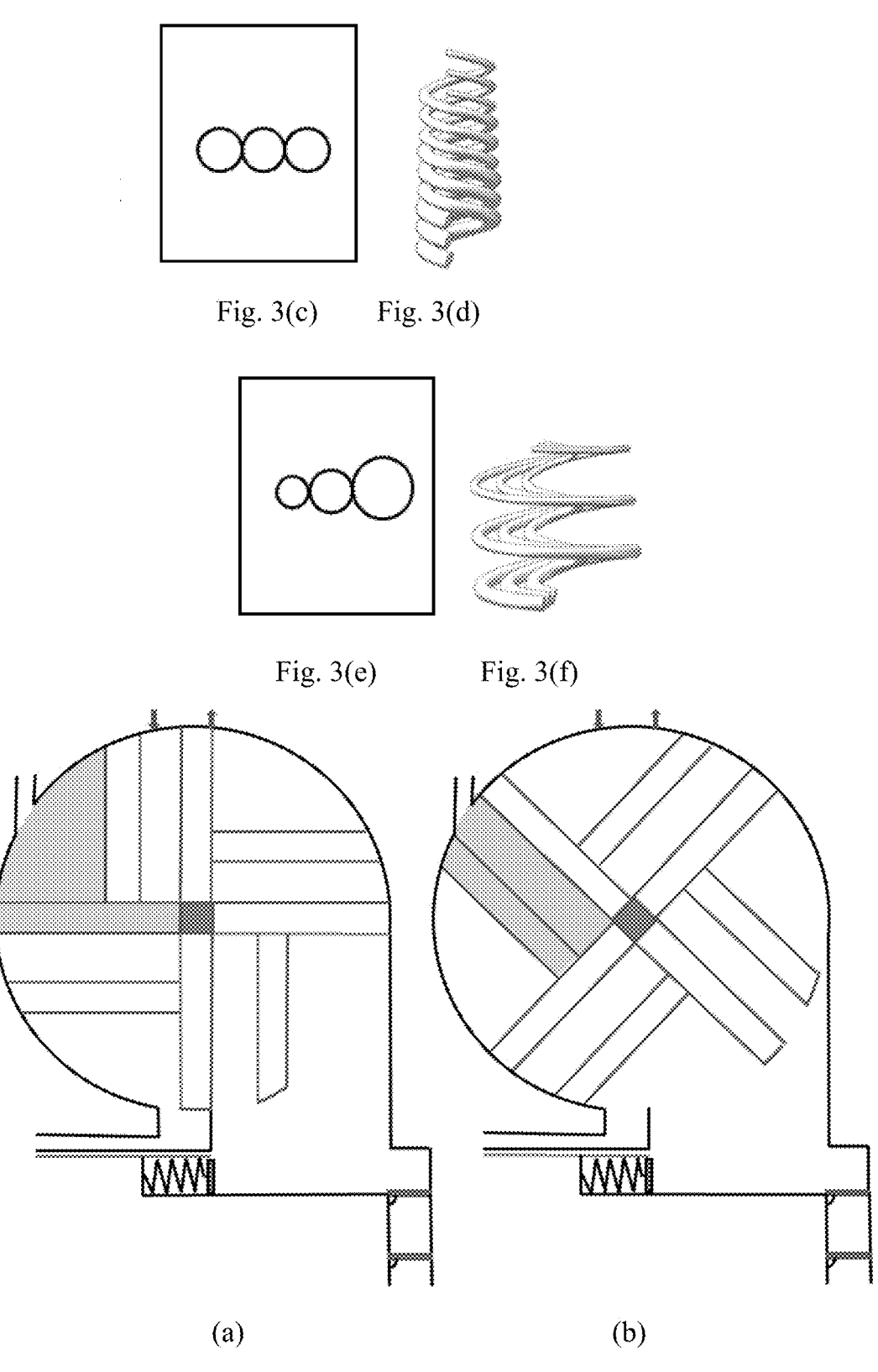
FIG. 4 shows two rotating states of a sieve plate frame in a solid-liquid separation chamber; a shaded area is a solid-liquid separation working area in the rotational state; a) is rotational state one, and b) is rotational state two.
Figure 5:
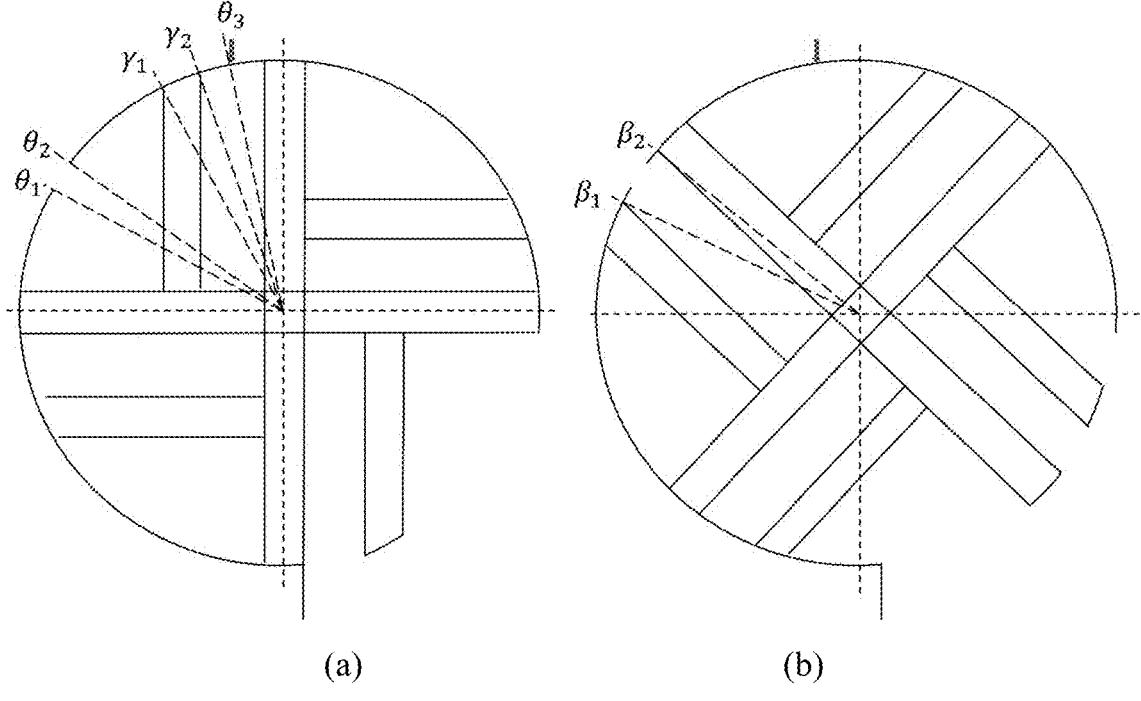
FIG. 5 is a schematic diagram of design parameters of a rotating sieve frame in a solid-liquid separation chamber; reference lines for marking angles are the same horizontal line; and (a) is the number corresponding to rotational state one; and (b) is the number corresponding to rotational state two.

FIG. 1 is a working principal diagram of an electric field-based $CO_2$ capture apparatus by a hydrate method, and the working process thereof is: an feed inlet is opened to make low-temperature seawater and low-temperature flue gas enter the hydrate nucleation chamber respectively, and the pressure in the hydrate nucleation chamber is regulated by controlling the injection amount of the flue gas, and water molecules in seawater and $CO_2$ in the flue gas form small particle hydrate under low temperature and high pressure. The hydrate slurries overflow into the hydrate rapid growth chamber, the hydrate particles grow rapidly under the action of electric field, and then the hydrate slurries flow into the hydrate solid-liquid separation chamber 39. Large hydrate particles are filtered and cleaned in the hydrate solid-liquid separation chamber 39, and the dry hydrate particles fall into the collection area and are compressed into blocks, achieving $CO_2$ capture. The temperature and pressure signals of each part in the reaction process are collected by a computer acquisition system, achieving real-time analysis and feed regulation.

FIG. 2 is a schematic diagram of an electric field-based $CO_2$ capture apparatus by a hydrate method.

(1) The filtered incoming seawater is conveyed to the heat exchanger a3 through the centrifugal pump a2, and heat exchange for the low-temperature concentrated seawater discharged from the hydrate solid-liquid separation chamber 39 is conducted, to achieve pre-cooling. Subsequently, the precooled seawater is divided into two ways through the diverter valve a4: the first way is sprayed from the top of the hydrate nucleation chamber into the inside, and this part of seawater reacts with the incoming hydrate former to nucleate during the spray process. The second way flows from the bottom of the hydrate nucleation chamber, providing seawater for the subsequent growth of the hydrate and serving as a flowing medium.

(2) The hydrate particles formed above the hydrate nucleation chamber fall to a level, overflow with the slurry from the outlet thereof under the pressure difference and gravity, and flow into the spiral pipe of the hydrate growth chamber for further growth. Because the density of some types of gas hydrate is more than that of water, some of the formed hydrate particles fail to overflow and fall to the bottom.

Stirring apparatuses are arranged at the bottom of the hydrate nucleation chamber, and it is difficult for the hydrate to grow on the bottom under the washing of the seawater at the bottom inlet and the action of the stirring apparatuses. At the same time, the stirring apparatuses accelerate the nucleation and growth of the hydrate, ensuring a large and stable supply of hydrate particles downstream.

(3) The hydrate growth chamber mainly has variable diameter spiral pipeline groups, and the diameter of each pipeline gradually increases from top to bottom. The outside of the pipeline is filled with circulating refrigerant, and an external electric field is also arranged in the hydrate growth chamber. The hydrate former gas is above an inlet section of the spiral pipeline, and small particle hydrate slurries are below. In the spiral flow process, the slurries are fully mixed with the gas, and the reinforcement of the external electric field is conducted, so that the hydrate rapidly grows. The increasing pipe diameter and uniform curvature of the pipeline can prevent the hydrate from blocking.

(4) The large particle hydrate slurries then flow into the hydrate solid-liquid separation chamber. The hydrate solid-liquid separation chamber is divided into four symmetrical partitions, each of which comprises two zones, a total of eight zones. Each partition comprises two functional plates, the upper layer is a sieve plate with large aperture, and the lower layer is a sieve plate with small aperture. The hydrate slurries only flow into one partition at a time and falls to the functional plates under gravity. The larger particles remain on the first layer of functional plate, and the smaller particles remain on the second layer of functional plate. The concentrated seawater continues to fall on a left side of the apparatus and flows out to the heat exchanger a3. After the cooling amount is released, the concentrated seawater is discharged from the apparatus. The filtered loose hydrate blocks are rotated to an upper partition position along with a filter plate and washed by the high-pressure hydrate former above. At this time, the next partition begins to receive the hydrate slurry, realizing continuous filtration of the hydrate slurries. The dried loose hydrate blocks continue to rotate with the filter plate until the hydrate blocks are rotated to two lower right partitions and all fall to a lower hydrate collection plate under the action of gravity.

(5) A pressure sensor is laid in the hydrate collection plate. When the weight of the hydrate reaches the required level, a telescopic plate 44 extends to push the hydrate to a compression area and make the hydrate compacted. The barrier plate 45 above the telescopic plate 44 is linked with the telescopic plate 44, getting in and out at the same time, and is used for blocking the hydrate falling from the top when the telescopic plate 44 is working. When the barrier plate 45 is recovered, the upper hydrate is scraped off to a collection area by a wet and dry partition plate. The linkage door 40 at the bottom of the compression area will automatically open when the telescopic plate is pressed to the end, so that the compressed hydrate block falls to a lower temporary storage area and the linkage door 40 will be closed when the telescopic plate 44 is recovered.

The invention claimed is:

1. An electric field-based $CO_2$ capture apparatus by a hydrate method, wherein the electric field-based $CO_2$ capture apparatus by a hydrate method comprises a seawater input module, a hydrate former supply module, a hydrate nucleation module, a hydrate enhanced growth module, an external electric field module, a hydrate slurry filtration module and a hydrate block collection module;

the seawater input module comprises a seawater supply pipeline, a heat exchanger a and a diverter valve a;

incoming seawater is precooled in the heat exchanger a through the seawater supply pipeline and a centrifugal pump a, and then flows through the diverter valve a into two ways according to the set ratio, a first seawater supply pipeline and a second seawater supply pipeline respectively; the first seawater supply pipeline is connected to a spray head at the top of a hydrate nucleation chamber through the valve, and the second seawater supply pipeline is connected to the bottom of the hydrate nucleation chamber;

the hydrate former supply module comprises an incoming hydrate former pipeline, a hydrate former recovery pipeline, a hydrate former supply main pipeline, a first hydrate former supply pipeline and a second hydrate former supply pipeline; after the incoming hydrate former enters an heat exchanger b through the incoming hydrate former pipeline for heat transfer, the hydrate former enters the hydrate former supply main pipeline through a mixing valve; and a centrifugal pump b and a diverter valve b are arranged on the hydrate former supply main pipeline; the hydrate former is divided into two ways through the diverter valve b, the first hydrate former supply pipeline and the second hydrate former supply pipeline respectively; the first hydrate former supply pipeline is connected to the top of the hydrate nucleation chamber and replenish the hydrate former so that the pressure reaches the designed pressure; the second water hydrate former pipeline is connected to a hydrate solid-liquid separation chamber; the hydrate solid-liquid separation chamber is connected with the hydrate former recovery pipeline; and the hydrate former flows out of the hydrate solid-liquid separation chamber, passes through a drain valve, a check valve b, a back pressure valve and a diverter valve c in turn, and then flows to the hydrate former recovery pipeline; the recovered hydrate former flows into two ways through the diverter valve c, a hydrate former recapture pipeline and an exhaust gas discharge pipeline respectively; the exhaust gas discharged from the exhaust gas discharge pipeline firstly flows through the heat exchanger b for heat transfer, to precool the incoming hydrate and then discharge; the hydrate former in the hydrate former recapture pipeline is mixed with the precooled hydrate former into the hydrate former supply main pipeline;

the hydrate nucleation module comprises the hydrate nucleation chamber; a spray head, a hydrate former inlet, a first pressure sensor and a thermometer are arranged above the hydrate nucleation chamber; a hydrate slurry overflow outlet connected to a first hydrate slurry conveying pipeline is arranged on a side wall of the hydrate nucleation chamber, and hydrate slurry binding agent flows into a spiral pipeline in the hydrate rapid growth chamber through the first hydrate slurry conveying pipeline; a seawater inlet is arranged at the bottom of the hydrate nucleation chamber to receive seawater from the second seawater supply pipeline; a plurality of stirrers are arranged at the bottom of the hydrate nucleation chamber, to make the liquid form uniform hydrate slurry and prevent the hydrate from growing at the bottom; and a discharge valve is arranged at the bottom of the hydrate nucleation chamber;

the hydrate enhanced growth module comprises the spiral pipeline, a circulating refrigeration pipeline and a heat exchanger c; the hydrate rapid growth chamber is filled with refrigerant and the spiral pipeline is placed therein; the circulating refrigeration pipeline is connected with the hydrate rapid growth chamber, and the heat exchanger c is installed on the pipeline; and cycle refrigeration of the refrigerant is achieved by the circulating refrigeration pipeline and the heat exchanger c;

the external electric field module comprises an electrode plate and a DC power supply; and two electrode plates are located at both ends of the hydrate rapid growth chamber respectively, and provide a DC electric field for an environment in which the hydrate enhanced growth module is located;

the hydrate slurry filtration module comprises a hydrate solid-liquid separation chamber, and a cross-section thereof is circular; the hydrate solid-liquid separation chamber has a built-in rotating sieve plate frame, comprising a rotating shaft and a multilayer sieve plate; the rotating shaft is arranged in a cross shape in the hydrate solid-liquid separation chamber which is divided into four partitions; the sieve plate is divided into large aperture and small aperture, the sieve plates of each partition are arranged up and down, and the sieve plate with large aperture is located above the partition; two ends of the sieve plate are respectively connected to the rotating shaft and the hydrate solid-liquid separation chamber; a pressure gauge, a hydrate slurry inlet, a hydrate former nozzle and a hydrate former outlet are respectively arranged above the hydrate separation chamber; the hydrate slurry inlet is connected to the hydrate rapid growth chamber through the second hydrate slurry conveying pipeline, the hydrate former nozzle is connected to the second hydrate former supply pipeline, and the hydrate former outlet is connected to the hydrate former recovery pipeline; the concentrated seawater separated from the hydrate solid-liquid separation chamber passes through a check valve a and flows into the heat exchanger a through a concentrated seawater discharge pipeline for heat transfer, and then is discharged; and the hydrate block collection module comprises a barrier plate, a telescopic plate, a collection plate, a linkage door, a hydrate block removal door and a hydrate block collection box; the hydrate block collection module is connected with a partition of the hydrate solid-liquid separation chamber, the collection plate bears the hydrate blocks in the partition, and the pressure sensor is embedded in the collection plate; the telescopic plate is located on one side of the collection plate, and the barrier plate is located above the telescopic plate, which are linked; the linkage door is located on the other side of the collection plate, and a lower end thereof is connected to the hydrate block collection box through the hydrate block removal door; and when the telescopic plate moves to the other side of the collection plate, the linkage door opens.

2. The $CO_2$ capture apparatus by a hydrate method according to claim 1, wherein the sieve plates have 16 layers, respectively 8 sieve plates with large aperture and 8 sieve plates with small aperture; and two layers of sieve plates are arranged in each partition; and the aperture of the upper sieve plate is larger than that of the lower sieve plate.

3. The $CO_2$ capture apparatus by a hydrate method according to claim 1, wherein the spiral pipeline has multiple pipes, and the pipe diameter increases from top to bottom.

4. The $CO_2$ capture apparatus by a hydrate method according to claim 1, wherein the spiral pipeline has two different combinations; in the first combination, each spiral pipeline has the same pipe diameter; and in the second combination, each spiral pipeline has different pipe diameter.

5. The $CO_2$ capture apparatus by a hydrate method according to claim 1, wherein when the hydrate blocks in the hydrate solid-liquid separation chamber are cleaned instead of drying, the hydrate former diverter valve b and the second hydrate former supply pipeline in the $CO_2$ capture apparatus by the hydrate method are canceled; and the incoming seawater diverter valve a is added into a three-way diverter valve, and the seawater in the third way is sprayed from the hydrate former nozzle into the hydrate solid-liquid separation chamber for rinsing the filtered solid hydrate.

6. The $CO_2$ capture apparatus by a hydrate method according to claim 1, wherein the hydrate slurry inlet corresponds to one partition each time; and the hydrate former nozzle corresponds to one partition every time; and the following requirements are satisfied:

$$\theta_2 < \gamma_1; \theta_2 < \beta_2; \theta_1 > \beta_1 \qquad 1)$$

$$\gamma_2 < \theta_3 \qquad 2)$$

where $\theta_2$ is an upper angle of the hydrate slurry inlet; $\gamma_1$ is the corresponding angle of the sieve plate with small aperture when the sieve plate is vertical; $\beta_2$ is the corresponding angle of the sieve plate with small aperture when the sieve plate tilts; $\theta_1$ is a lower angle of the hydrate slurry inlet; $\gamma_2$ is the corresponding angle of the sieve plate with large aperture when the sieve plate is vertical; and $\theta_3$ is an angle of a center line of the hydrate former nozzle.

7. An electric field-based $CO_2$ capture apparatus by a hydrate method, comprising the following steps of:

step 1: the filtered incoming seawater is conveyed to the heat exchanger a through the centrifugal pump a, and heat exchange for the low-temperature concentrated seawater separated and discharged from the hydrate solid-liquid separation chamber is conducted, to achieve pre-cooling; the precooled seawater is divided into two ways through the diverter valve a; the first way is sprayed from the top of the hydrate nucleation chamber into the inside, and this part of seawater reacts with the incoming hydrate former to nucleate during the spray process; and the second way flows from the bottom of the hydrate nucleation chamber, providing seawater for the subsequent growth of the hydrate and serving as a flowing medium;

step 2: hydrate particles formed above the hydrate nucleation chamber fall to a level, and overflow with the slurry from the outlet thereof under the pressure difference and gravity; and the overflowed small particle hydrate slurries flow into the hydrate rapid growth chamber in which the hydrate slurries continue to grow in a spiral pipeline; stirring apparatuses are arranged at the bottom of the hydrate nucleation chamber, and it is difficult for the hydrate to grow on the bottom under the washing of part of the seawater at the bottom inlet and the action of the stirring apparatuses; and at the same time, the stirring apparatuses accelerate the nucleation and growth of the hydrate, ensuring a large and stable supply of small particle hydrate slurries downstream;

step 3: the hydrate growth chamber mainly has spiral pipeline groups, and the diameter of each pipeline increases from top to bottom; the outside of the pipeline is filled with circulating refrigerant, and an external electric field is also arranged in the hydrate growth chamber; the hydrate former gas is above an inlet section of the spiral pipeline, and small particle hydrate slurries are below; and in the spiral flow process, the small particle hydrate slurries are fully mixed with the gas, and the reinforcement of the external electric field is conducted, so that the hydrate grows into large particle hydrate slurry; the increasing pipe diameter and uniform curvature of the pipeline can prevent the hydrate from blocking;

step four: the large particle hydrate slurries flow into the hydrate solid-liquid separation chamber, and the hydrate slurries only flow into one partition of the hydrate solid-liquid separation chamber at a time and fall to the sieve plate under the action of gravity; the large particles remain on an upper sieve plate, and the small particles remain on a lower sieve plate; and the concentrated seawater continues to fall on a side of the hydrate solid-liquid separation chamber and flows out to the heat exchanger a, releasing the cold amount and then discharging; after sieving, the hydrate blocks are rotated to an upper partition position along with the sieve plate and washed by the high-pressure hydrate former above; at this time, the next partition begins to receive the hydrate slurry and realize the continuous sieving of the hydrate slurries; and the hydrate particles washed and dried by the hydrate former continue to rotate with a filter plate until the hydrate particles reach a lower right partition and all fall to a lower hydrate collection plate under the action of gravity; and step five: a pressure sensor is laid in the hydrate collection plate; when the weight of the hydrate reaches the required level, a telescopic plate extends to push the hydrate to a compression area and compacts the hydrate; the barrier plate above the telescopic plate is linked with the telescopic plate, getting in and out at the same time, and block the hydrate falling from the top when the telescopic plate is working; when the barrier plate is recovered, the upper hydrate is scraped off to a collection area by a wet and dry partition plate; and the linkage door at the bottom of the compression area will automatically open when the telescopic plate is pressed to the end, so that the compressed hydrate block falls to a lower temporary storage area, and the linkage door will be closed when the telescopic plate is recovered.

8. The electric field-based $CO_2$ capture apparatus by a hydrate method according to claim 7, wherein the hydrate former in step 1 and the high-pressure hydrate former in step 3 are flue gases containing $CO_2$.

9. The electric field-based $CO_2$ capture apparatus by a hydrate method according to claim 7, wherein the external electric field is the electric field of DC power supply, and the voltage of the DC power supply is 0-12V.

\* \* \* \* \*